United States Patent [19]
Shiroyama

[11] Patent Number: 5,267,918
[45] Date of Patent: Dec. 7, 1993

[54] RING-SHAPED INTERNAL GEAR FOR EPICYCLIC REDUCTION GEAR TYPE STARTER DEVICE

[75] Inventor: Shigeru Shiroyama, Hyogo, Japan

[73] Assignee: Mitsubishi Denki K.K., Tokyo, Japan

[21] Appl. No.: 868,092

[22] Filed: Apr. 14, 1992

[30] Foreign Application Priority Data

Apr. 15, 1991 [JP] Japan ............... 3-34271[U]

[51] Int. Cl.$^5$ ............... F16H 55/02; F16H 55/06; F02N 15/02
[52] U.S. Cl. .................. 475/331; 74/7 E; 74/DIG. 10; 475/902
[58] Field of Search ............ 74/7 E, DIG. 10; 475/331, 902

[56] References Cited

U.S. PATENT DOCUMENTS

| | | | |
|---|---|---|---|
| 3,081,648 | 3/1963 | Duer | 475/902 X |
| 3,376,761 | 4/1968 | Stepputtis | 475/331 X |
| 4,561,316 | 12/1985 | Bolz et al. | 74/7 E |
| 4,590,811 | 5/1986 | Kasubuchi | 74/7 E |
| 4,604,907 | 8/1986 | Morishita et al. | 74/7 E |
| 4,635,489 | 1/1987 | Imamura et al. | 74/7 E |
| 4,680,979 | 7/1987 | Morishita et al. | 74/7 E |
| 4,715,243 | 12/1987 | Morishita et al. | 74/DIG. 10 X |
| 5,086,658 | 2/1992 | Isozumi | 74/7 E |
| 5,088,338 | 2/1992 | Konishi | 74/7 E |
| 5,098,358 | 3/1992 | Igaku | 74/DIG. 10 X |
| 5,157,978 | 10/1992 | Morishita et al. | 74/7 E |

FOREIGN PATENT DOCUMENTS

2-66363 3/1990 Japan ............... 74/DIG. 10

Primary Examiner—Leslie A. Braun
Assistant Examiner—David E. Henn
Attorney, Agent, or Firm—Sughrue, Mion, Zinn Macpeak & Seas

[57] ABSTRACT

In an epicycle reduction gear type starter device comprising a ring-shaped internal gear 20 which is molded from resin and secured to a front frame so as to engage with planet gears driven by a DC motor, the internal gear 20 has ribs 21 in the outer periphery of an annular inner portion and which are substantially equal in thickness and are arranged at substantially equal angular intervals, and a cylinder 22 which is small in wall thickness to which the outer radial edges of the ribs are connected, locking protrusions 23 are formed on the cylinder 22 which are locked to the front frame so as to prevent the rotation of the internal gear, and through-holes 24 are formed in the locking protrusions 23, respectively, into which through-bolts are inserted to secure the DC motor and the front frame. According to the arrangements, the teeth of the internal gear are prevented from being broken, and the lowering in gear accuracy of the internal gear is prevented which is caused when, in molding the, internal gear, the portion of the molding is deformed which corresponds to the locking means which is engaged with the starter frame for prevention of the rotation of the internal gear.

2 Claims, 3 Drawing Sheets

RING-SHAPED INTERNAL GEAR FOR EPICYCLIC REDUCTION GEAR TYPE STARTER DEVICE

BACKGROUND OF THE INVENTION

This invention relates to an epicyclic reduction gear type starter device which transmits the rotation of a DC motor through epicyclic reduction gear means to a pinion which is brought into and out of engagement of the ring gear of an engine, and more particularly to a ring-shaped internal gear adapted to the epicyclic reduction gear type starter device.

FIGS. 3 through 5 shows a conventional epicyclic reduction gear type starter device. The starter device 1 comprises: a DC motor 2; an over-running clutch 4 slidably mounted on an output rotary shaft 3 which is coupled to the armature rotary shaft of the DC motor 2; and epicyclic reduction gear means 5 for reducing the speed of rotation of the armature rotary shaft and transmitting the rotation thus speed-reduced to the clutch outer of the over-running clutch 4 through the output rotary shaft 3. The starter device 1 further comprises a shift lever 6 which is driven by an electromagnetic switch (not shown), so that a pinion 7 mounted on the output rotary shaft 3 is moved into or out of engagement with the ring gear of the engine.

The epicyclic reduction gear means 5 comprises: an internal gear 10 of resin coupled to a housing 9 which is secured to a front bracket 8; a spur gear 11 formed on the armature rotary shaft; and a plurality of planet gears 12. The planet gears 12 are supported by a carrier 13, which is coupled to the output rotary shaft 3. In FIG. 3, reference numeral 14 designates a packing.

As shown in FIG. 5, two inserting grooves 15 are formed in the outer periphery of the internal gear 10 in such a manner that they are positioned diametrically opposite. Through-bolts (not shown) are inserted into those inserting grooves 15. In addition, two protrusions 16 are provided diametrically opposite from each other and at positions which are circumferentially shifted about 30° in a counterclockwise direction from the above-described two inserting grooves 15, respectively. The two protrusions 16 are locked to the housing 9 for prevention of the rotation of the internal gear.

The operation of the conventional epicyclic reduction gear type starter device thus constructed will be described.

When the DC motor 1 is electrically energized, the rotation of the armature rotary shaft is transmitted through the spur gear 11 to the planet gears 12. Thus, with the speed of rotation reduced by the epicyclic reduction gear means 5, the rotation is transmitted to the over-running clutch 4 and the output rotary shaft 3. In this operation, the pinion 7 engaged with the over-running clutch 4 is rotated, so that the ring gear of the engine engaged with pinion is rotated.

The above-described conventional epicyclic reduction gear type starter device suffers from the following difficulties: When a heavy load is applied to the epicyclic reduction gear means 5, the internal gear 10 is deformed polygonally in correspondence substantially to the number of planet gears 12, so that the engagement between the internal gear 10 and the planet gears 12 is shallow. As a result, the bearing pressure is increased, or the load applied to the tips of teeth increases the dedendum stress, so that the teeth are broken.

The through-bolt inserting grooves 15 are different in thickness from the locking protrusion 16. Hence, when the internal gear 10 is molded from resin, the resultant molding deforms; that is, the internal gear 10 formed is low in gear accuracy.

SUMMARY OF THE INVENTION

Accordingly, an object of this invention is to eliminate the above-described difficulties accompanying a conventional epicyclic reduction gear type starter device for transmitting the rotation of a DC motor through epicyclic reduction gear means to the ring gear of an engine. More specifically, an object of the invention is to provide an internal gear for an epicyclic reduction gear type starter device in which the teeth of the internal gear are prevented from being broken, and the lowering in gear accuracy of the internal gear is prevented which is caused when, in molding the internal gear, the portion of the molding is deformed which corresponds to the locking means which is engaged with the starter frame for prevention of the rotation of the internal gear.

The foregoing object of the invention has been achieved by the provision of a ring-shaped internal gear for an epicyclic reduction gear type starter device, which, according to the invention, comprises ribs formed in the outer periphery of the internal gear and which are substantially equal in thickness and are arranged at substantially equal angular intervals, and a cylinder having a predetermined small wall thickness to which the outer edges of the ribs are connected. The internal gear may further comprise locking protrusions formed on the cylinder and which are locked to the front frame so as to prevent the rotation of the internal gear, and through-holes respectively formed in the locking protrusions, into which through-bolts are inserted to secure the DC motor and the front frame.

In another example of the internal gear for the epicyclic reduction gear type starter device, locking protrusions, which are formed on the outer periphery of the internal gear, are locked to the front frame so as to prevent the rotation of the internal gear, and through-holes are respectively formed in each of the locking protrusions, into which through-bolts are inserted to secure the DC motor and the front frame.

As was described above, the internal gear has the ribs in the outer periphery, and the thin wall cylinder to which the outer edges of the ribs are connected. This structure prevents the internal gear from being damaged by a heavy load or thermal stress, and reduces the noise. On the other hand, the locking protrusions are formed on the outer periphery of the internal gear, and the through-holes, into which the through-bolts are inserted, are formed in the locking protrusions, so that, in the outer periphery of the internal gear, the locking protrusions are made substantially equal in wall thickness to the remaining portions where no locking protrusions are formed. Hence, in molding the internal gear, the molding is free from deformation, and the internal gear formed is attendantly improved in gear accuracy.

DETAILED DESCRIPTION OF THE PREFERRED EMBODIMENTS

Figure 1A:
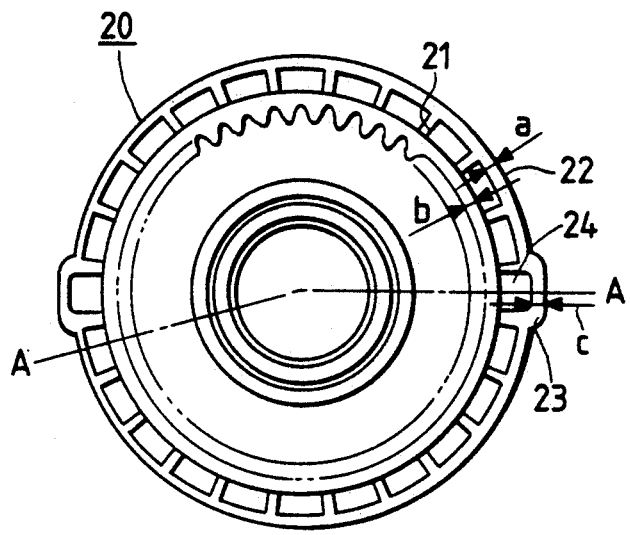
FIG. 1A a front view showing essential parts of an internal gear adapted to an epicyclic reduction gear type starter device, which constitutes a first embodiment of this invention.
Figure 1B:
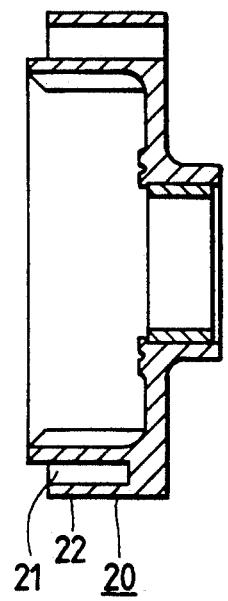
FIG. 1B is a sectional view taken along line A—A in FIG. 1A.

In FIGS. 1A and 1B, reference numeral 20 designates an internal gear formed from a macromolecular synthetic resin material by resin molding. The internal gear 20 is made up of a number of ribs 21 which are formed in the outer periphery of an annular inner portion in such a manner that they are extended radially, and a cylinder or outer cylindrical portion 22 which is small in wall thickness to which the outer radial edges of the ribs 21 are connected.

The thickness of the ribs 21 is substantially equal to the wall thickness (a) of the cylinder 22, and is smaller than the dimension (b) between the outside of the body of the internal gear 20 and the base of each of the ribs 21. The axial length of the ribs 21 and the cylinder 22 which is small in wall thickness (hereinafter referred to as "a thin wall cylinder 22", when applicable) is longer than a half (½) of the length for which the internal gear engages with the planet gears 12. In the internal gear, a step is formed where no ribs 21 are formed, to receive the packing 14.

The outer periphery of the internal gear 20 is partially expanded to form locking protrusions 23 which are locked to the housing 9 for prevention of the rotation of the internal gear 20. In each of the protrusion 23, a through-hole 24 is formed into which the through-bolt is inserted.

In the above-described embodiment, the internal gear 20 has a number of ribs 21 in the outer periphery, and the outer edges of the ribs 21 are connected to the thin wall cylinder 22. This structure prevents the internal gear from being deformed or damaged by a heavy load. Furthermore, in the outer periphery of the internal gear 20, locking protrusions 23 are formed which are locked to the housing 9 for prevention of the rotation of the internal gear, and through-bolts 24 into which the through-bolts are inserted are formed in the locking protrusions 23. That is, in the outer periphery of the internal gear 20, the protrusions are made equal in thickness to the remaining portions where no protrusions 23 are formed. Hence, in forming the internal gear, the deformation of the molding is prevented, and the internal gear is improved in accuracy as much.

Figure 2:
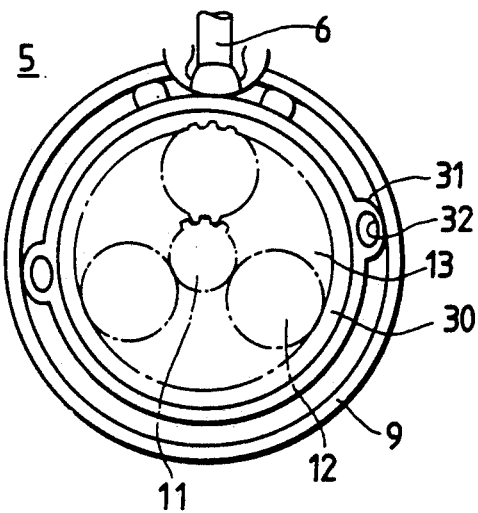
FIG. 2 is a front view showing essential parts of an internal gear adapted to an epicyclic reduction gear type starter device, which constitutes a second embodiment of the invention.
Figure 3:
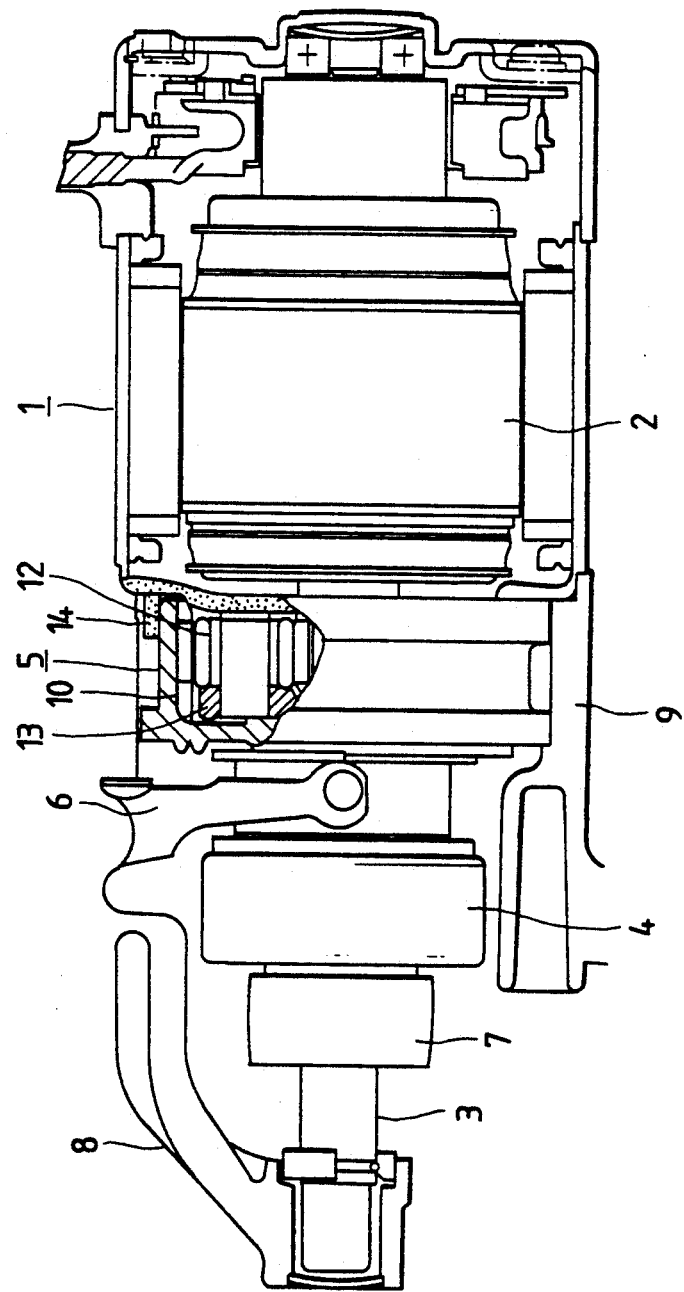
FIG. 3 is a side view, with parts cut away, showing a conventional epicyclic reduction gear type starter device.
Figure 4:
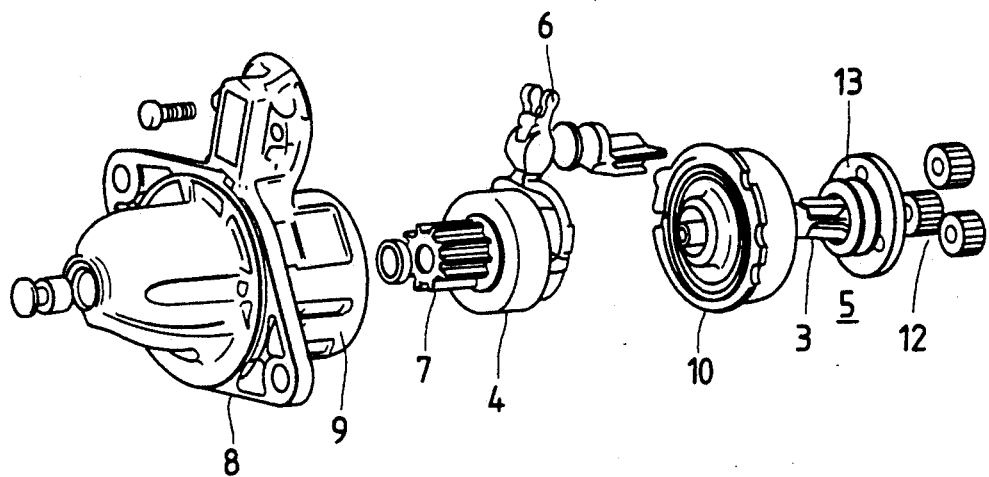
FIG. 4 is a perspective view of the conventional epicyclic reduction gear type starter device.
Figure 5:
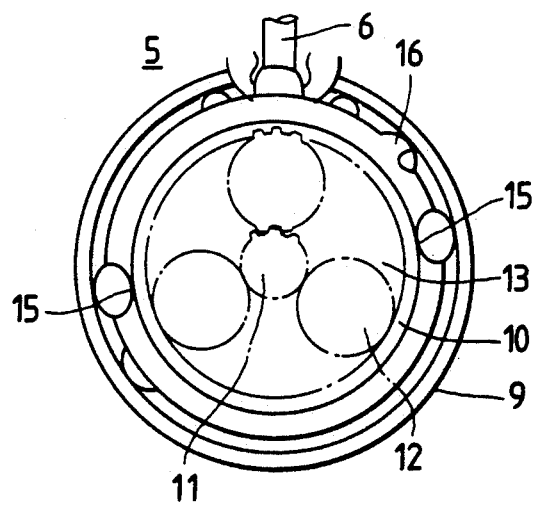
FIG. 5 is a front view showing essential parts of an internal gear used in the conventional epicyclic reduction gear type starter device.

Another example of an internal gear adapted to an epicyclic reduction gear type starter device, which constitutes a second embodiment of the invention, will be described with reference to FIG. 2. In the second embodiment, the ribs 21 and the thin wall cylinder 22 shown in FIG. 1 are not employed, and instead locking protrusions 31 to be locked to the housing 9 for prevention of the rotation of the internal gear 30 are formed directly in the outer periphery of the internal gear 30, and through-holes 32, into which through-bolts are inserted, are formed in the locking protrusions 31, respectively.

The second embodiment is advantageous in that in molding the internal gear 30, the resultant molding is free from deformation, and the internal gear 30 is simple in structure, and high in gear accuracy.

As was described above, according to the invention, the internal gear has the ribs in the outer periphery, and the thin wall cylinder to which the outer edges of the ribs are connected. This structure prevents the internal gear from being damaged by a heavy load or thermal stress, and reduces the noises.

The through-holes are formed in the locking protrusions which are formed in the outer periphery so as to be locked to the housing for prevention of the rotation of the internal gear, so that, in the periphery of the internal gear, the locking protrusions are made substantially equal in wall thickness to the remaining portions where no locking protrusions are formed. Hence, in molding the internal gear, the resultant molding is free from deformation, and the internal gear formed is attendantly improved in gear accuracy.

What is claimed is:

1. A ring-shaped internal gear for an epicyclic reduction gear type starter device and which is molded from resin and secured to a front frame so as to engage with planet gears driven by a DC motor, said internal gear comprising:

an annular inner portion comprising an inner periphery having a plurality of gear teeth formed thereon, and an outer periphery;

a plurality of radially extending ribs, formed in the outer periphery of said annular inner portion, which are substantially equal in thickness and are arranged at substantially equal angular intervals, said ribs including outer radial edges;

an outer cylindrical portion having a predetermined thin wall thickness relative to said annular inner portion, to which the outer radial edges of said ribs are connected;

locking protrusions formed on said outer cylindrical portion and protruding radially outwardly therefrom, and which are locked to said front frame so as to prevent the rotation of said internal gear; and a through-hole formed by each of said locking protrusions and two of said ribs adjacent to a corresponding locking protrusion and into which a corresponding through-bolt is inserted to secure said DC motor and said front frame, wherein each locking protrusion has a wall thickness which is substantially equal to said predetermined thin wall thickness of said outer cylindrical portion.

2. The internal gear according to claim 1, wherein a thickness of each of said ribs is substantially equal to said wall thickness of said outer cylindrical portion.

* * * * *